United States Patent [19]

Anderson et al.

[11] 4,264,443
[45] Apr. 28, 1981

[54] TRANSMISSION FLUID FILTER

[75] Inventors: David L. Anderson; A. David Joseph, both of Muskegon, Mich.; Robert M. Tamburrino, Chicago, Ill.

[73] Assignee: Sealed Power Corporation, Muskegon, Mich.

[21] Appl. No.: 12,664

[22] Filed: Feb. 16, 1979

[51] Int. Cl.³ .................. F01M 11/03; B01D 39/08
[52] U.S. Cl. ........................ 210/168; 29/163.5 F; 210/171; 210/445; 210/455
[58] Field of Search .............. 16/2; 29/163.5 F; 85/50 R; 210/65, 168, 171, 172, 232, 416 L, 445, 455; 285/130, 194, 213; 292/1; 403/243

[56] References Cited

U.S. PATENT DOCUMENTS

| | | | |
|---|---|---|---|
| 1,251,487 | 1/1918 | Duck | 16/2 |
| 2,930,605 | 3/1960 | Stewart | 85/50 R X |
| 3,014,592 | 12/1961 | Stephens | 210/168 |
| 4,136,011 | 1/1979 | Joseph et al. | 210/168 |

*Primary Examiner*—Peter A. Hruskoci
*Attorney, Agent, or Firm*—Barnes, Kisselle, Raisch & Choate

[57] ABSTRACT

A transmission fluid filter comprising a metal base pan and a filter frame of thermoplastic construction which supports a filter medium in spaced relation to the base pan. Axially aligned openings in the frame and base pan received bolts for mounting the filter to a transmission housing. In accordance with the invention, a metal eyelet is crimped around a circumferential bead in the filter frame and has a central flat portion for absorbing the clamping stresses exerted by the mounting bolts remotely of the bead and crimp to permit high bolt retention stresses while relieving the problem of plastic creep and deformation.

4 Claims, 3 Drawing Figures

U.S. Patent
Apr. 28, 1981
4,264,443
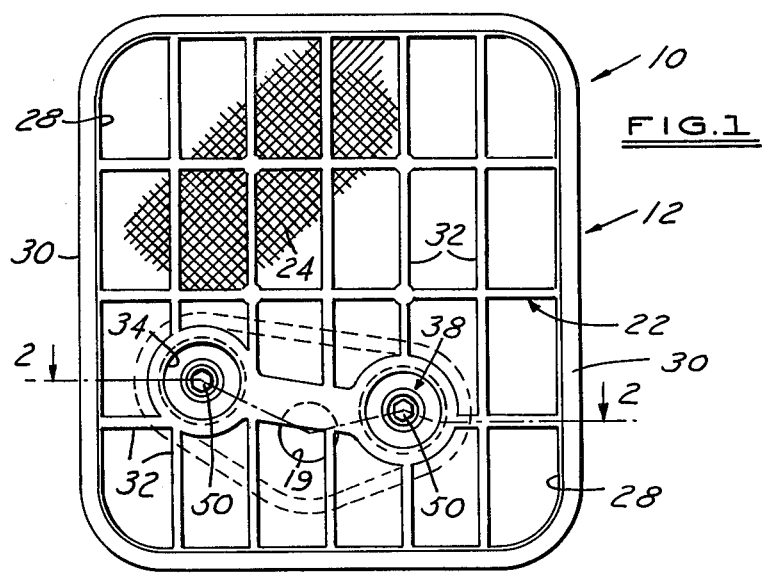
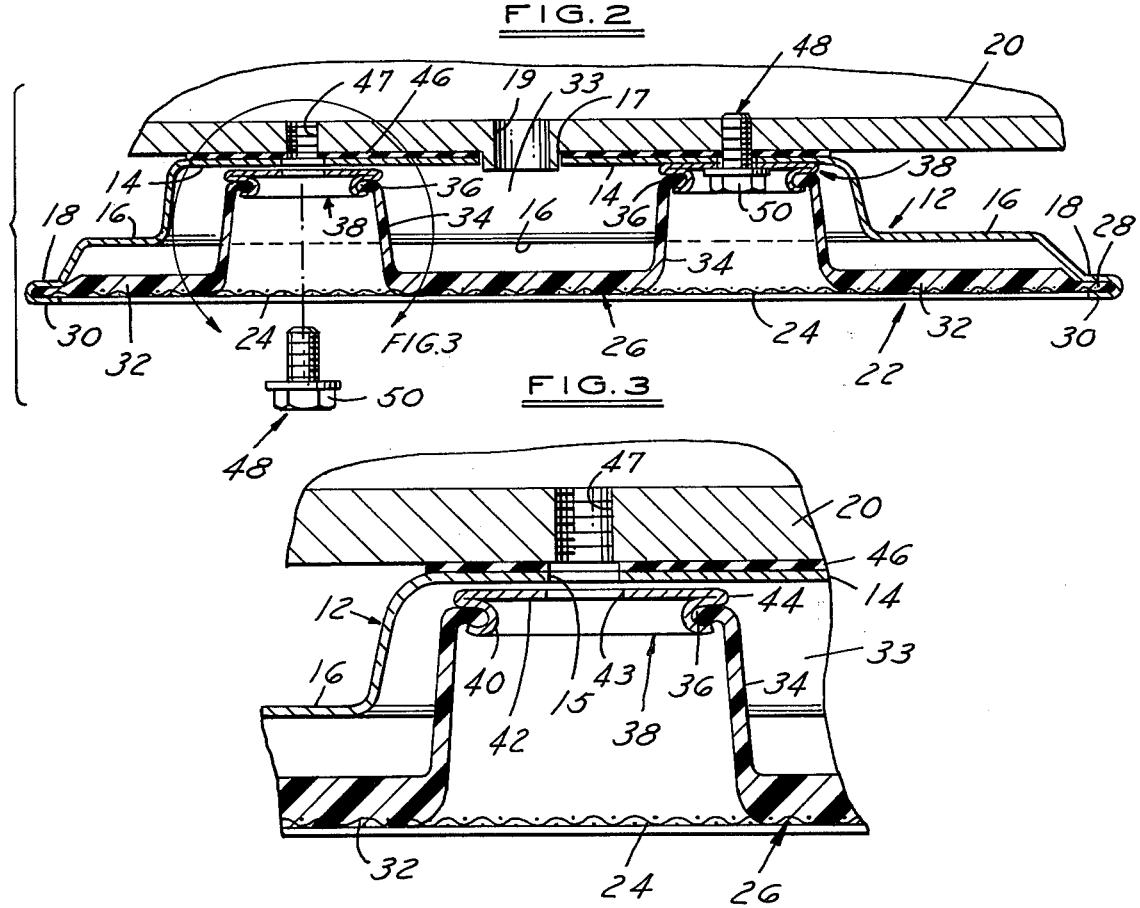

TRANSMISSION FLUID FILTER

The present invention in its broadest aspects is directed to an arrangement for removably fastening a deformable member to another body. More specifically, the invention is directed to a transmission fluid filter which is constructed, at least in part, to thermoplastic material, and to an arrangement for securely fastening the filter to a transmission pump housing.

An object of the present invention is to provide an arrangement for securely fastening a member of deformable construction, such as thermoplastic, to a second body without subjecting the deformable material to high retention or clamping stresses.

A more specific object of the invention is to provide a transmission fluid filter which is constructed at least in part of economical thermoplastic material, and which includes an arrangement for mounting the filter to a transmission pump housing without subjecting the thermoplastic material to high retention stresses.

The invention, together with additional objects, features and advantages thereof, will be best understood from the following description, the appended claims and the accompanying drawings in which:

FIG. 1 is a plan view of a transmission fluid filter in accordance with the invention;

FIG. 2 is a side sectional view taken along the line 2—2 in FIG. 1 and illustrates the filter partially assembled to a transmission pump housing; and FIG. 3 is an enlarged view of the portion of FIG. 2 encircled by the line 3—3.

Referring to the drawings, a transmission fluid filter assembly 10 is illustrated therein and comprises a dished rectangular base member or pan 12 of stamped sheet steel or the like having a generally flat upper wall 14 (in the orientation of FIGS. 2 and 3), an intermediate shoulder 16 and a flat peripheral shoulder 18 successively radiating from wall 14 and parallel therewith. Flat wall 14 includes a pair of fastener-receiving openings 15 and a central opening 17 for fluid communication with the flanged inlet 19 of a transmission pump housing 20.

A filter element generally indicated at 22 is carried by base pan 12 and includes a fine mesh or screen 24 molded into a one-piece support frame 26. Mesh 24 preferably comprises fibers of plastic construction such as polyester, for example. Support frame 26 is preferably of high-temperature synthetic thermoplastic resin construction such as fiberglass-reinforced nylon (polyamide). Frame 26 includes a flat peripheral edge or rim 28 captured against shoulder 18 by an inwardly struck lip or flange 30 extending around the shoulder edge. A plurality of ribs 32 are molded integrally with edge 28 in a grid-like rectangular pattern best seen in FIG. 1. Ribs 32 support mesh 24 in a plane spaced from pan wall 14 to define a filtered fluid cavity 33 therebetween which communicates with transmission inlet opening 19. Mesh 24 is molded into the upper surface of frame 22, including ribs 32 and edge 28, such that the mesh is firmly supported against sagging between the adjacent ribs which might otherwise take place due to clogging. As best seen in FIG. 1, the fibers of mesh 24 extend generally diagonally of the rectangular pattern of supporting ribs 32.

A pair of frustoconical bosses 34 extend narrowingly from frame ribs 32 across fluid cavity 33 into proximity with wall 14 of base pan 12. Each of the bosses 34 terminates in a circular opening defined by an annular enlargement or bead 36 aligned in assembly with a base pan opening 15. A metal eyelet generally indicated at 38 includes a peripheral flange crimped as at 40 over bead 36 and a central flat portion 42 having a circular opening 43 axially aligned with a corresponding wall opening 15. Each eyelet portion 42 is coupled to the corresponding peripheral portion 40 by a circumferentially continuous reversed bend 44. Central flat eyelet portion 42 is carried by peripheral portion 40 and bead 36 in a plane parallel with the plane of bead 36 and axially spaced therefrom in the direction of wall 14. It will be noted that the central flat portion 42 of eyelet 38 is axially spaced from pan wall 14 in the relaxed or unmounted condition of the filter, i.e. prior to insertion and tightening of bolts 48. This is particularly important since it is desirable to remove any potential stresses which might tend to bow wall 14 prior to assembly, so that the wall will be conditioned for flat facing engagement in assembly with transmission housing 20 with the sealing gasket 46 sandwiched therebetween.

To mount transmission filter 10 to pump housing 20, the filter assembly is fitted over pump inlet 19 with a sealing gasket 46 sandwiched therebetween and with the aligned eyelet and wall openings 43,15 (and gasket openings) in axial registry with corresponding internally threaded openings 47 in the pump housing. A pair of headed fasteners, such as the bolt illustrated at 48 in FIG. 2, are then threaded into corresponding mounting openings 47 in the transmission housing. Bolts 50 are preferably tightened to a torque on the order of fifteen ft.-lbs., for example, firmly to mount the filter to the transmission housing, with the central portion 42 of each eyelet 38 being firmly sandwiched between the corresponding head 50 of bolts 48 and the opposing wall 14 of base pan 12. Thus, eyelet 38 in accordance with the invention effectively absorbs bolt retention stresses remotely of crimp 40 and bead 36. The thermoplastic material of filter frame 22 thereby has a substantially reduced tendency to creep and deform under the high temperature and vibration conditions of the transmission, with consequent potential loss of bolt torque and loosening of the filter.

Although the invention has been described in connection with a presently preferred embodiment thereof, alternatives and modifications are envisioned. For example, bolts 48 may be replaced by nuts received on threaded studs or the like permanently attached to the transmission housing. Similarly, non-threaded fastening means may be utilized in some applications. Thus, the term "headed fastener" in the appended claims must be read in the broad sense as encompassing any fastening means which includes an axial portion which extends between the members or bodies to be joined and a radiating head portion adapted firmly to clamp one member against an opposing surface of the other.

The invention claimed is:

1. In a transmission fluid filter assembly comprising a base member of metal construction having at least one mounting opening, a filter medium and a filter frame of thermoplastic construction including first means for carrying said filter medium in spaced relation to said base member to define a filtered fluid cavity therebetween and second means aligned with said mounting opening for receiving a headed fastener to clamp the filter assembly to a transmission housing, the improvement wherein said second means comprises a circular opening in said filter frame defined by an annular bead and an eyelet of metal construction having a circumferentially continuous peripheral portion with a flange crimped in sealing engagement over said bead and a flat central portion with a central opening to receive the fastener such that the fastener head engages and exerts clamping stresses on said flat central portion remote from said annular bead.

2. The filter set forth in claim 1 wherein said base member includes a generally flat wall which includes said at least one mounting opening and is adapted for facing engagement with a transmission housing with a sealing gasket sandwiched therebetween, wherein said first means carries said filter medium in a plane spaced from said flat wall, and wherein said second means includes means extending across said cavity for positioning said eyelet in proximity to said flat wall.

3. The filter set forth in claim 2 wherein said eyelet is spaced from said flat wall in the relaxed condition of said frame such that clamping stresses exerted on said eyelet by a said threaded fastener bow said frame and firmly sandwich said eyelet central portion between the fastener head and said wall.

4. In an arrangement for mounting a transmission fluid filter comprising a fluid filter assembly having a base member of metal construction with at least one mounting opening, a filter medium and a plastic filter frame including first means for carrying said filter medium in spaced relation to said base member to define a filtered fluid cavity therebetween and second means aligned with said mounting opening, and a headed fastener adapted to be received through said second means to clamp the filter to a transmission housing, the improvement wherein said second means comprises an opening in said filter frame defined by a peripheral bead and a metal eyelet having a continuous peripheral portion with a flange crimped in sealing engagement over said bead and a flat central portion with a central opening to receive the fastener such that said fastener head engages and exerts clamping stresses on said flat central portion remote from said bead.

* * * * *